United States Patent
Soma et al.

(10) Patent No.: US 7,899,588 B2
(45) Date of Patent: Mar. 1, 2011

(54) EXTERNALLY CHARGEABLE ELECTRIC/HYBRID VEHICLE

(75) Inventors: Takaya Soma, Toyota (JP); Eiichi Ishii, Nissin (JP); Masatoshi Takahara, Okazaki (JP)

(73) Assignees: Toyota Jidosha Kabushiki Kaisha, Toyota (JP); Aisin Aw Co., Ltd., Anjo (JP)

( * ) Notice: Subject to any disclaimer, the term of this patent is extended or adjusted under 35 U.S.C. 154(b) by 0 days.

(21) Appl. No.: 12/733,697

(22) PCT Filed: Oct. 16, 2008

(86) PCT No.: PCT/JP2008/068765

§ 371 (c)(1),
(2), (4) Date: Mar. 16, 2010

(87) PCT Pub. No.: WO2009/051185

PCT Pub. Date: Apr. 23, 2009

(65) Prior Publication Data

US 2010/0217468 A1 Aug. 26, 2010

(30) Foreign Application Priority Data

Oct. 19, 2007 (JP) ............................ 2007-272908

(51) Int. Cl.
*G05D 1/00* (2006.01)

(52) U.S. Cl. ....................................................... 701/22
(58) Field of Classification Search ........................ None
See application file for complete search history.

(56) References Cited

U.S. PATENT DOCUMENTS

2007/0073455 A1 3/2007 Oyobe et al.

(Continued)

FOREIGN PATENT DOCUMENTS

JP A-8-154307 6/1996

(Continued)

OTHER PUBLICATIONS

International Search Report mailed on Nov. 11, 2008 in corresponding International Application No. PCT/JP2008/068765 (with translation).

(Continued)

*Primary Examiner*—Khoi Tran
*Assistant Examiner*—Brian J Broadhead
(74) *Attorney, Agent, or Firm*—Oliff & Berridge PLC

(57) ABSTRACT

An object is to take measures to reduce engine exhaust gas of an externally chargeable electric/hybrid vehicle. An externally chargeable electric/hybrid vehicle comprises a battery for supplying electrical power to the motor, a generator that charges the battery with electrical power generated by the driving forces of the engine, and an external charging unit that supplies electrical power from an external power supply device to the battery to charge the battery, and the vehicle travels in either an EV mode or an HV mode. The vehicle further comprises a charged amount measuring unit for measuring externally charged electrical energy supplied from the external charging unit to the battery, and a travel mode determination unit for determining in which driving mode of the EV mode or the HV mode the vehicle travels, based on the externally charged electrical energy. The vehicle travels in a travel mode according to the result determined by the travel mode determination unit.

6 Claims, 5 Drawing Sheets

U.S. PATENT DOCUMENTS

| | | |
|---|---|---|
| 2009/0096416 A1 | 4/2009 | Tonegawa et al. |
| 2009/0101421 A1 | 4/2009 | Oyobe et al. |
| 2009/0150015 A1* | 6/2009 | Okubo et al. .................. 701/22 |
| 2009/0240387 A1* | 9/2009 | Kawai et al. .................. 701/22 |
| 2009/0288896 A1* | 11/2009 | Ichikawa ............... 180/65.265 |
| 2010/0145560 A1* | 6/2010 | Komatsu et al. ............... 701/22 |
| 2010/0204863 A1* | 8/2010 | Sakamoto et al. ............. 701/22 |
| 2010/0217468 A1* | 8/2010 | Soma et al. ................... 701/22 |
| 2010/0235016 A1* | 9/2010 | Grider et al. ................... 701/2 |

FOREIGN PATENT DOCUMENTS

| | | |
|---|---|---|
| JP | A-9-98517 | 4/1997 |
| JP | A-2002-274219 | 9/2002 |
| JP | A-2007-62638 | 3/2007 |
| JP | A-2007-94867 | 4/2007 |
| JP | A-2007-185083 | 7/2007 |
| JP | A-2007-237792 | 9/2007 |

OTHER PUBLICATIONS

Notice of Grounds of Rejection mailed on Nov. 4, 2008 in corresponding Japanese Application No. 2007-272908 (with translation).

* cited by examiner

EXTERNALLY CHARGEABLE ELECTRIC/HYBRID VEHICLE

TECHNICAL FIELD

The present invention relates to an externally chargeable electric/hybrid vehicle which can be charged from the outside and travels by means of at least one of the driving force of a motor and the driving force of an engine.

BACKGROUND ART

Hybrid vehicles having an engine for driving travel of the vehicle and a motor for driving travel of the vehicle are widely used. A hybrid vehicle travels by means of a driving force of at least one of an engine and a motor. As energy efficiencies of an engine and a motor vary depending on rotating states thereof, energy efficiencies can be improved by controlling contributions of the engine and the motor to the travel driving force according to traveling states of the vehicle.

A hybrid vehicle has a generator which charges a battery for supplying electrical power to a motor using electrical power generated by the driving force of the engine. The generator charges the battery during the time that the engine is driven, and stores electrical energy for driving the motor in the battery. Thereby, the hybrid vehicle can travel with a supply of gasoline for driving the engine, without having to charge the battery from the outside.

In recent years, an increasing number of users prefer operability and ride quality of a hybrid vehicle traveling by the driving force of the motor. Also, a demand to reduce engine exhaust gas has increased.

As such, an electric/hybrid vehicle which travels not only in an HV mode, in which contributions to the travel driving forces of the engine and the motor are controlled depending on traveling states of the vehicle, but also in an EV mode, in which the vehicle travels solely by the driving force of the motor, has been developed. Generally, an electric/hybrid vehicle is adapted such that those traveling modes can be set in accordance with choices of the user.

When a vehicle travels in the EV mode, as the battery will never be charged with electrical power generated by the driving force of the engine, the charged electrical energy of the battery may be insufficient. As such, in the electric/hybrid vehicle, when the charged electrical energy becomes insufficient, the mode is forcibly set to the HV mode even when the EV mode has been selected. Further, in order to prevent shortage of the charged electrical energy, an externally chargeable electric/hybrid vehicle, having an external charging device for charging the battery from a power source such as a commercial electrical output, has been invented.

PATENT DOCUMENT 1: JP 9-98517 A
PATENT DOCUMENT 2: JP 2002-274219 A

DISCLOSURE OF THE INVENTION

Problems to be Solved by the Invention

In order to reduce engine exhaust gas per certain travel distance of an externally chargeable electric/hybrid vehicle, during travel in the EV mode, it is preferable not to use electrical energy charged by electrical power generated by driving the engine, but to use electrical energy charged by external charging. As such, it is preferable to charge the battery not by electrical power generated by engine drive but solely by external charging.

In the externally chargeable electric/hybrid vehicle, if external charging is not sufficiently performed, the charged electrical energy of the battery becomes insufficient, so that the travel mode of the vehicle is forcibly set to the HV mode. In that case, the electrical energy charged in the battery includes both electrical energy generated by external charging and electrical energy generated by engine drive. According to the conventional control, if the charged electrical energy is sufficient, the electrical energy charged in the battery is used for travel in the EV mode regardless of the source of the electrical energy.

As such, when travel in the EV mode is performed by the conventional control, there is a case where the electrical energy generated by engine drive is used in large amount during travel in the EV mode, causing a problem that engine exhaust gas per certain travel distance may be large.

The present invention has been developed in view of this problem. An object of the present invention is to take measures to reduce engine exhaust gas of an externally chargeable electric/hybrid vehicle.

Means for Solving the Problems

In the present invention, an externally chargeable electric/hybrid vehicle includes a battery for supplying electrical power to a motor, a generator that generates electrical power by the driving force of an engine and charges the battery with the generated electrical power, and an external charging unit that supplies electrical power from an external power supply device to the battery so as to charge the battery, and the externally chargeable electric/hybrid vehicle travels in a travel mode of either an EV mode in which the vehicle travels not by the driving force of the engine but by the driving force of the motor, or an HV mode in which the vehicle travels using at least one of the driving force of the motor and the driving force of the engine. The externally chargeable electric/hybrid vehicle further includes a charged amount measuring unit that measures externally charged electrical energy supplied from the external charging unit to the battery, and a travel mode determination unit that determines whether the vehicle travels in the EV mode or the HV mode based on the externally charged electrical energy, and the vehicle travels in a travel mode according to the result determined by the travel mode determination unit.

It is preferable that the externally chargeable electric/hybrid vehicle according to the present invention further includes a total charged electrical energy measuring unit that measures total charged electrical energy of the battery, and that the travel mode determination unit determines to travel in the HV mode when a ratio of the externally charged electrical energy to the total charged electrical energy is smaller than a predetermined threshold.

It is also preferable that the externally chargeable electric/hybrid vehicle according to the present invention further includes a regenerative charging unit that supplies regenerative braking-generated electrical energy, generated by the motor through regenerative braking, to the battery so as to charge the battery, and a regenerative amount measuring unit that measures regenerative charged electrical energy supplied from the regenerative charging unit to the battery, and that the travel mode determination unit calculates the sum of the externally charged electrical energy and the regenerative charged electrical energy as determination reference electrical energy, and determines the travel mode based on the determination reference electrical energy.

It is also preferable that the externally chargeable electric/hybrid vehicle according to the present invention further includes a discharged electrical energy measuring unit that measures discharged electrical energy output from the battery, and that the travel mode determination unit calculates determination reference electrical energy by subtracting a value, obtained by multiplying the discharged electrical energy by a predetermined constant, from the externally charged electrical energy, and determines the travel mode based on the determination reference electrical energy.

It is also preferable that the externally chargeable electric/hybrid vehicle according to the present invention further includes a total charged electrical energy measuring unit that measures total charged electrical energy of the battery, and that the travel mode determination unit determines to travel in the HV mode when a ratio of the determination reference electrical energy to the total charged electrical energy is smaller than a predetermined threshold.

Advantage of the Invention

According to the present invention, engine exhaust gas of an externally chargeable electric/hybrid vehicle can be reduced.

Figure 1:
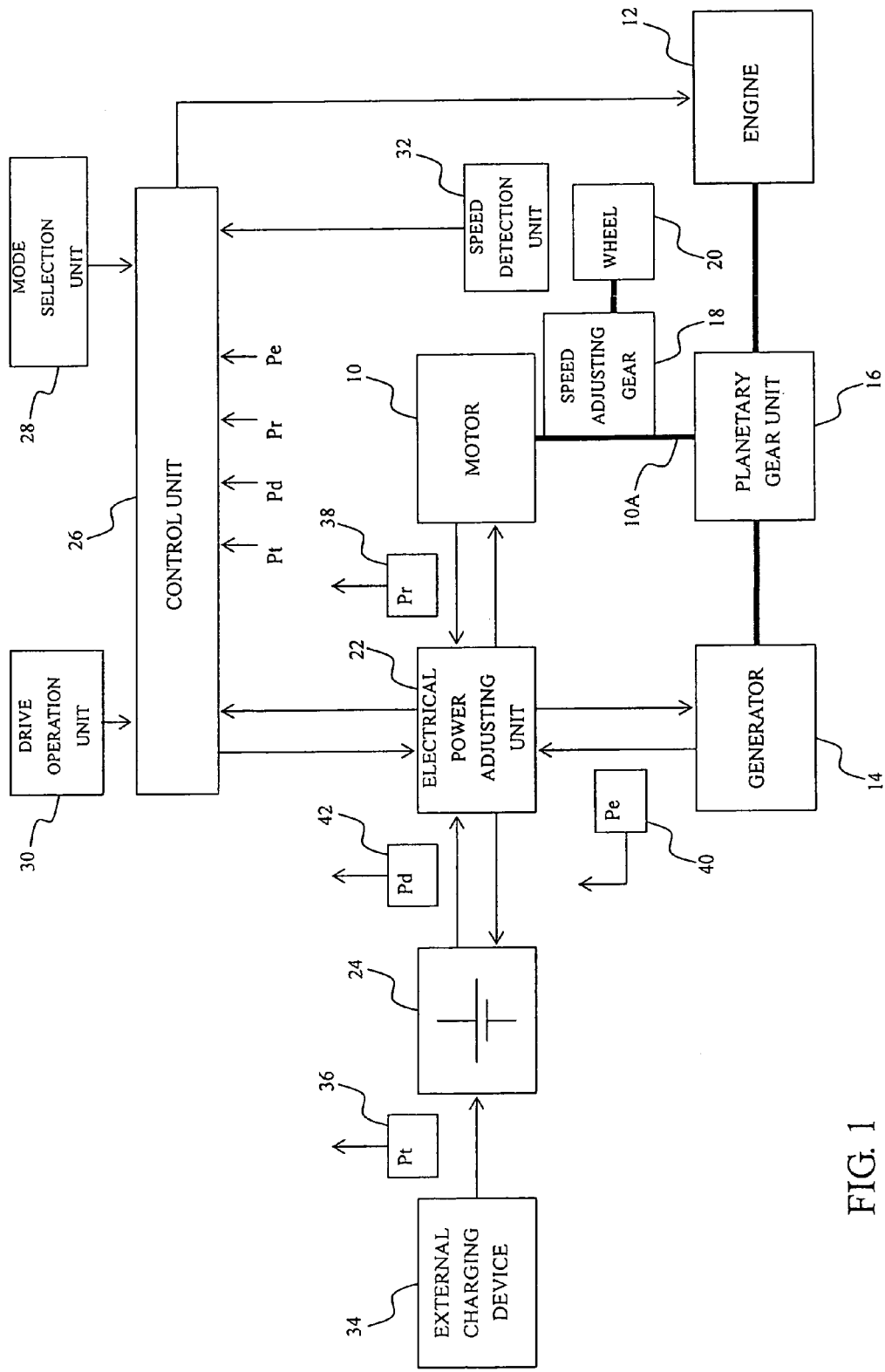
FIG. 1 is a diagram showing the configuration of an externally chargeable electric/hybrid vehicle according to an embodiment of the present invention.

REFERENCE NUMERALS 10 motor, 12 engine, 14 generator, 16 planetary gear unit, 18 speed adjusting gear, 20 wheel, 22 electrical power adjusting unit, 24 battery, 26 control unit, 28 mode selection unit, 30 drive operation unit, 32 speed detection unit, 34 external charging device, 36 externally charged electrical energy measuring unit, 38 motor regenerative electrical energy measuring unit, 40 engine-generated electrical energy measuring unit, 42 discharged electrical energy measuring unit.

BEST MODE FOR CARRYING OUT THE INVENTION (1) Basic Configuration of Externally Chargeable Electric/Hybrid Vehicle FIG. 1 shows the configuration of an externally chargeable electric/hybrid vehicle according to an embodiment of the present invention. The externally chargeable electric/hybrid vehicle includes a motor 10, an engine 12, a generator 14, a planetary gear unit 16, a speed adjusting gear 18, wheels 20, an electrical power adjusting unit 22, a battery 24, a control unit 26, a mode selection unit 28, a drive operation unit 30, a speed detection unit 32, an external charging device 34, an externally charged electrical energy measuring unit 36, a motor regenerative electrical energy measuring unit 38, an engine-generated electrical energy measuring unit 40, and a discharged electrical energy measuring unit 42.

The externally chargeable electric/hybrid vehicle travels in either an EV mode or an HV mode according to a selective operation of the mode selection unit 28. An EV mode is a mode in which the vehicle travels only with the driving force of the motor 10. An HV mode is a mode in which the vehicle travels using at least one of the driving force of the motor 10 and the driving force of the engine 12, corresponding to a traveling state of the vehicle. In order to transmit a driving force corresponding to a traveling state, the externally chargeable electric/hybrid vehicle includes a planetary gear unit 16.

The planetary gear unit 16 transfers a driving force among the motor 10, the engine 12, and the generator 14. With the planetary gear unit 16, by setting any one of the motor 10, the engine 12, and the generator 14 such that the rotation thereof is fixed or the rotational speed thereof becomes constant, a driving force can be transferred between the other two elements. As such, by setting the generator 14 such that the rotation thereof is fixed or the rotational speed thereof is constant, the driving force of the engine 12 can be transferred to a motor shaft 10A. In this case, if the motor 10 is driven, the combined driving force of the engine 12 and the motor 10 can be applied to the motor shaft 10A.

The speed adjusting gear 18 transfers the driving force of the motor shaft 10A to the wheels 20 at a predetermined rotational speed ratio. As such, the driving force of the motor 10 or the engine 12 applied to the motor shaft 10A is transferred to the wheels 20 through the speed adjusting gear 18.

Further, with the planetary gear unit 16, by setting the motor 10 such that the rotation thereof is fixed or the rotational speed thereof is constant, the driving force can be transferred between the engine 12 and the generator 14. As a result, the engine 12 can be started by the driving force of the generator 14 during travel driven by the motor. Further, the generator 14 can generate electrical power by the driving force of the engine 12.

Further, with the planetary gear unit 16, by allowing any one of the motor 10, the engine 12, and the generator 19 to rotate idly, the planetary gear unit 16 can be in a non-load state with respect to the other two elements. As such, by allowing the generator 14 to be in an idly rotating state, the planetary gear unit 16 becomes a non-load state with respect to the motor 10. In this way the sole driving force of the motor 10 can be transferred to the wheels 20 through the speed adjusting gear 18.

The rotating states of the motor 10 and the generator 14 can be controlled by adjusting electrical power transferred between the motor 10 and the battery 24 and electrical power transferred between the generator 14 and the battery 24. In order to adjust the transferred electrical power, electrical power adjusting units 22 are provided between the battery 24 and the motor 10 and between the battery 24 and the generator 14.

The electrical power adjusting units 22 adjust electrical power to be supplied from the battery 24 to the motor 10, and to the generator 14, based on control by the control unit 26, and adjust electrical power to be supplied to the battery 24 from the motor 10 and from the generator 14 by power generation.

The control unit 26 controls rotating states of the motor 10 and the generator 14 by controlling electrical power adjusting values generated by the electrical power adjusting unit 22.

(2) EV Mode Traveling

Travel control in an EV mode will be described. The control unit 26 allows the generator 14 to rotate idly and allows the engine 12 to stop. As a result, the planetary gear unit 16 becomes a no-load state with respect to the motor 10, so that the driving force of the motor 10 is transferred to the wheels 20 through the speed adjusting gear 18.

The control unit 26 obtains a target speed according to drive operation information output from the drive operation unit 30. The control unit 26 controls the motor 10 such that the vehicle travel speed detected by the speed detection unit 32 becomes the target speed.

If the vehicle travel speed is slower than the target speed, the control unit 26 controls the motor 10 to receive electrical power supplied from the battery 24. In this way, the motor 10 transfers acceleration driving force to the wheels 20. If the vehicle travel speed is faster than the target speed, the control unit 26 controls the motor 10 to supply regenerative braking electrical power to the battery 24. The motor 10 thereby transfers the regenerative braking force to the wheels 20, and the battery 24 is charged by regenerative braking power generation.

(3) HV Mode Traveling

Travel control in an HV mode will be described. The control unit 26 obtains requested driving force requested by driving operation, based on the drive operation information output from the drive operation unit 30, and on the vehicle travel speed detected by the speed detection unit 32. If the requested driving force is less than a driving force threshold and the vehicle travel speed is less than a speed threshold, the control unit 26 performs the same control as that of the EV mode.

In contrast, if the requested driving force is a driving force threshold or larger, or the vehicle travel speed is a speed threshold or larger, the control unit 26 starts the engine 12 using the driving force of the generator 14.

After the engine has been started 12, the control unit 26 controls the motor 10, the generator 14, and the engine 12 such that the externally chargeable electric/hybrid vehicle travels with a combined driving force of the engine 12 and the motor 10 or solely by the driving force of the engine 12. Determination of whether the vehicle travels by the combined driving force of the engine 12 and the motor 10 or solely by the driving force of the engine 12 is performed so as to improve the energy efficiency, corresponding to the drive operation information and the vehicle travel speed.

The control unit 26 controls the driving force of the engine 12 or the driving force of the motor 10 transferred to the wheels 20 such that the vehicle travel speed becomes the target speed which is determined based on the drive operation information. If the vehicle travel speed is slower than the target speed, the control unit 26 increases the driving force of the engine 12 or the driving force of the motor 10 transferred to the wheels 20. As a result, the engine 12 or the motor 10 transfers the acceleration driving force to the wheels 20. If the vehicle travel speed is faster than the target speed, the control unit 26 decreases the driving force of the engine 12 or the driving force of the motor 10 transferred to the wheels 20. In this way, the engine 12 or the motor 10 transfers the braking force to the wheels 20. The battery 24 is charged by the regenerative braking power generation of the motor 10.

While the engine 12 is driven, the control unit 26 controls the motor 10, the generator 14, and the engine 12 such that the driving force of the engine 12 is transferred to the generator 14. As a result, the electrical power generated by the generator 14 is supplied to the battery 24, so that the battery 24 is charged with the electrical energy for driving the motor 10 and the generator 14.

Generally, energy efficiencies of the engine and the motor vary depending on the rotating states. In the HV mode traveling, contributions to the travel driving force of the engine 12 and the motor 10 can be controlled in accordance with the rotating states of the engine 12 and the motor 10. As such, the energy efficiency can be made higher.

Further, in the HV mode traveling, the battery 24 can be charged with electrical power generated by the generator 14 by means of the driving force of the engine 12. As such, the battery 24 can be charged with electrical energy for driving the motor 10 and the generator 14.

(4) Forced HV Setting Control

In the EV mode traveling, the charged electrical energy of the battery 24 is consumed for motor-driven traveling, and the battery 24 is charged by regenerative braking power generation by the motor 10. On the other hand, in the HV mode traveling, the charged electrical energy of the battery 24 is consumed for motor-driven traveling and for start-up of the engine 12 by the generator 14. The battery 24 is charged by regenerative braking power generation by the motor 10 and engine-driven power generation using the generator 14.

As such, while the battery 24 can be charged by engine-driven power generation in the HV mode traveling, the battery 24 will not be charged by engine-driven power generation in the EV mode traveling. Accordingly, in the EV mode traveling, as frequency of the battery 24 being charged is low, rapid acceleration and long-distance drive may be difficult due to shortage of the charged electrical energy of the battery 24. In view of the above, the externally chargeable electric/hybrid vehicle according to this embodiment of the present invention includes an external charging device 34 for charging the battery 24 with use of an electrical power source such as a commercial power outlet. With the external charging device 24, the battery 24 can be charged from a commercial power outlet when the vehicle is stopped, enabling prevention of the charged electrical energy from running out.

Further, according to the externally chargeable electric/hybrid vehicle according to this embodiment of the present invention, if the charged electrical energy of the battery 24 is insufficient for EV mode traveling, control to forcibly set the traveling mode to the HV mode is performed even when the EV mode has been selected.

Now, the forced HV setting control will be described. This control is to determine whether or not to forcibly set the traveling mode to HV mode traveling according to the charged state of the battery 24 when the EV mode has been selected, and based on the determination result, to forcibly set to HV mode traveling. The charged state of the battery 24 is evaluated based on the total charged electrical energy Pa of the battery 24 and the externally charged electrical energy Pt charged by external charging.

The total charged electrical energy Pa of the battery 24 is calculated by subtracting discharged electrical energy Pd, which has been consumed by the motor 10 and the generator 19, from a summed value of externally charged electrical energy Pt, motor regenerative electrical energy Pr charged by regenerative braking power generation by the motor 10, engine-generated electrical energy Pe charged by engine-driven power generation, and initial charged electrical energy P0. As such, the total charged electrical energy Pa of the battery 24 is calculated by Pa=Pt+Pr+Pe+P0−Pd.

In order to measure the externally charged electrical energy Pt, the externally chargeable electric/hybrid vehicle includes an externally charged electrical energy measuring unit 36. The externally charged electrical energy measuring unit 36 measures the externally charged electrical energy Pt by time-integrating electrical power supplied from the external charging device 34 to the battery 24.

In order to measure the motor regenerative electrical energy Pr, the externally chargeable electric/hybrid vehicle includes a motor regenerative electrical energy measuring unit 38. The motor regenerative electrical energy measuring unit 38 measures the motor regenerative electrical energy Pr by time-integrating electrical power supplied from the motor 10 to the battery 24.

In order to measure the engine-generated electrical energy Pe, the externally chargeable electric/hybrid vehicle includes an engine-generated electrical energy measuring unit 40. The engine-generated electrical energy measuring unit 40 measures the engine-generated electrical energy Pe by time-integrating electrical power supplied from the generator 14 to the battery 24.

In order to measure the discharged electrical energy Pd, the externally chargeable electric/hybrid vehicle includes a discharged electrical energy measuring unit 42. The discharged electrical energy measuring unit 42 measures discharged electrical energy Pd by time-integrating electrical power supplied from the battery 24 to the motor 10 and to the generator 14.

It should be noted that the initial charged electrical energy P0 indicates electrical energy charged in the battery 24 at a reference time when each of the electrical energy measuring units measures an electrical power integrated value.

Figure 2:
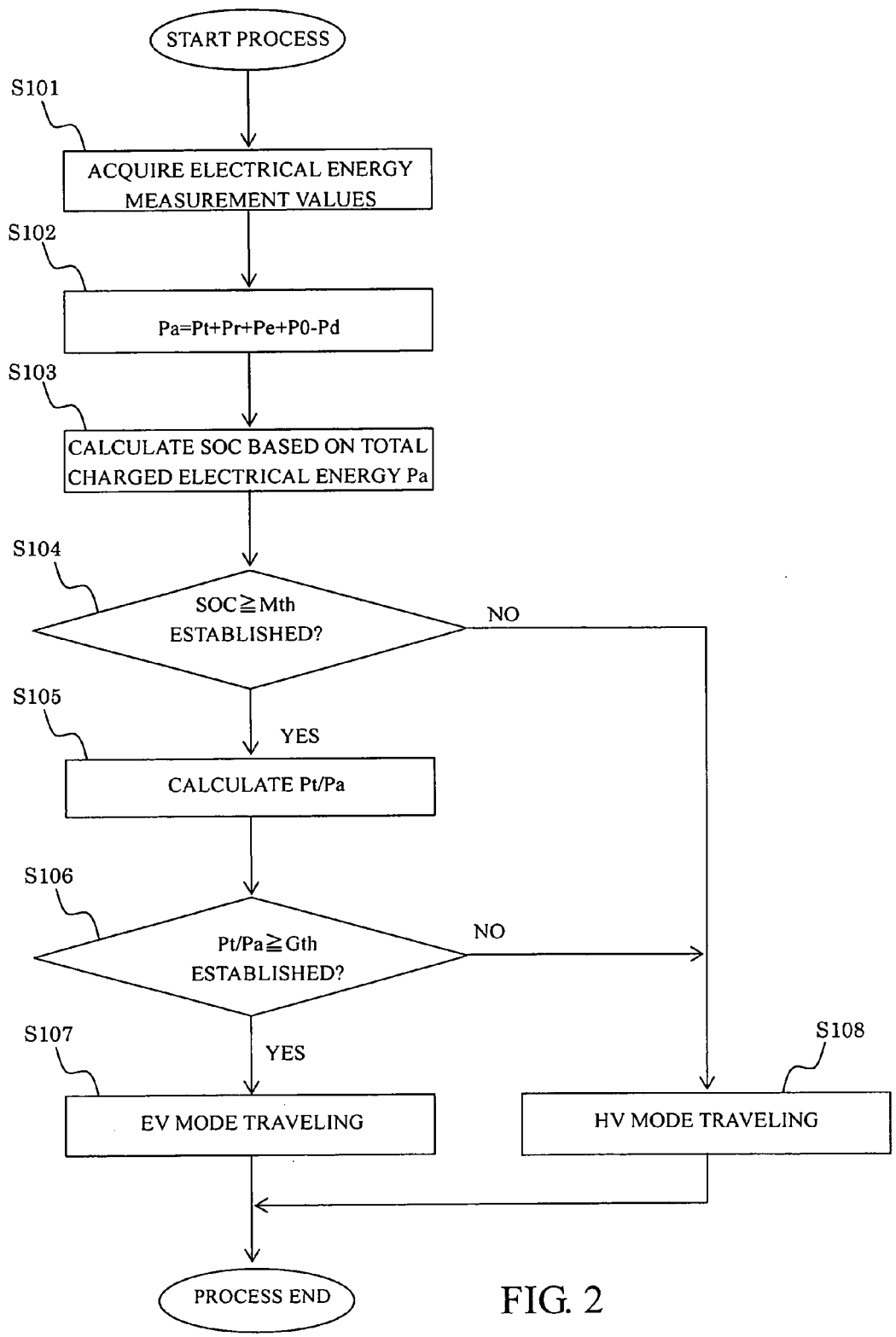
FIG. 2 is a flowchart showing forced HV control based on an external charge ratio Pt/Pa.

FIG. 2 is a flowchart showing forced HV setting control. When the EV mode is selected by the mode selection unit 28, the control unit 26 acquires the externally charged electrical energy Pt, the motor regenerative electrical energy Pr, the engine-generated electrical energy Pe, and the discharged electrical energy Pd, from the externally charged electrical energy measuring unit 36, the motor regenerative electrical energy measuring unit 38, the engine-generated electrical energy measuring unit 40, and the discharged electrical energy measuring unit 42, respectively (S101).

The control unit 26 calculates a value, as the total charged electrical energy Pa, by subtracting the discharged electrical energy Pd from the sum of the externally charged electrical energy Pt, the motor regenerative electrical energy Pr, the engine-generated electrical energy Pe, and the initial charged electrical energy P0 (S102). Then, the control unit 26 converts the total charged electrical energy Pa into electrical charge amount, and calculates SOC (State Of Charge) by dividing the total charged electrical charge amount by the charged electrical charge amount when the battery 24 is fully charged (full charge capacity) (S103).

The control unit 26 compares the SOC with a predetermined HV mode transition threshold Mth (S104). If the value of the SOC is smaller than the HV mode transition threshold Mth, the control unit 26 performs control for HV mode traveling (S108). It should be noted that the HV mode transition threshold Mth is a minimum SOC required for EV mode traveling.

According to these processes, if the total charged electrical energy Pa is insufficient for EV mode traveling, the travel mode of the externally chargeable electric/hybrid vehicle is forcibly changed to the HV mode.

On the other hand, if the value of the SOC is the HV mode transition threshold Mth or larger, the control unit 26 calculates an external charge ratio Pt/Pa by dividing the externally charged electrical energy Pt by the total charged electrical energy Pa (S105), and compares the external charge ratio Pt/Pa with a predetermined low exhaust gas threshold Gth (S106). If the external charge ratio Pt/Pa is smaller than the low exhaust gas threshold Gth, the control unit 26 performs control for HV mode traveling (S108). On the other hand, if the external charge ratio Pt/Pa is the low exhaust gas threshold Gth or larger, the control unit 26 performs control for EV mode traveling (S107).

According to these processes, even when the total charged electrical energy Pa is sufficient for EV mode travel, if the ratio of the externally charged electrical energy Pt to the total charged electrical energy Pa is small, the travel mode of the externally chargeable electric/hybrid vehicle is forced to be the HV mode. As a result, it is possible to prevent the engine-generated electrical energy Pe from being consumed in a large quantity in the EV mode.

In general, engine exhaust gas per certain travel distance is less in HV mode traveling than that in the EV mode traveling using the engine-generated electrical energy Pe. According to the control shown in FIG. 2, as the travel mode is forcibly set to the HV mode before the engine-generated electrical energy Pe is consumed in large quantity in the EV mode, engine exhaust gas can be reduced. The amount of reduction of the engine exhaust gas may be increased by adjusting the low exhaust gas threshold Gth to be optimum. As such, the low exhaust gas threshold Gth is preferably set based on simulations, experiments, or the like so that the engine exhaust gas becomes the minimum.

At step S104 in the flowchart of FIG. 2, it is determined whether or not to set the travel mode to HV mode based on the external charge ratio Pt/Pa. Alternatively, it is also acceptable to determine whether or not to set the travel mode to HV mode based on an external and regenerative charge ratio (Pt+Pr)/Pa calculated by dividing the value Pt+Pr, which is the sum of the externally charged electrical energy Pt and the motor regenerative electrical energy Pr, by the total charged electrical energy Pa.

Figure 3:
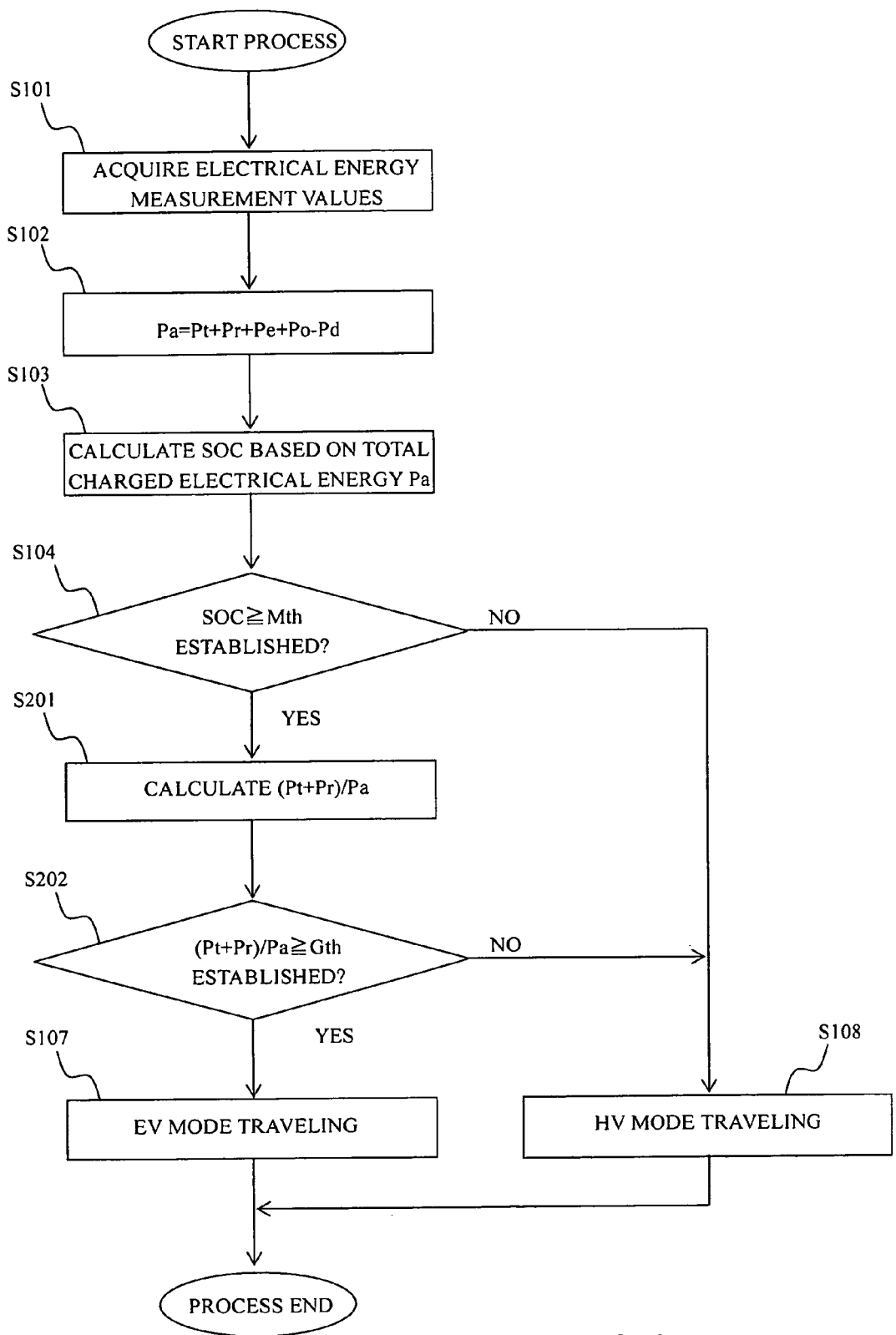
FIG. 3 is a flowchart showing forced HV control based on an external and regenerative charge ratio (Pt+Pr)/Pa.

FIG. 3 is a flowchart showing forced HV setting control in this case. The same steps as those in FIG. 2 are denoted by the same reference numerals and the description is not repeated. In the control according to this flowchart, when the control unit 26 determines that the value of the SOC is the HV mode transition threshold Mth or larger (S104), the control unit 26 calculates the external and regenerative charge ratio (Pt+Pr)/Pa (S201). Then, based on comparison between the external and regenerative charge ratio (Pt+Pr)/Pa and the low exhaust gas threshold Gth, the control unit 26 determines whether or not to forcibly set the HV mode (S202). With these processes, determination is made such that the motor regenerative electrical energy Pr is used more actively in EV mode traveling, compared with the processes shown in FIG. 2.

As the motor regenerative electrical energy Pr recovers a part of kinetic energy of the externally chargeable electric/hybrid vehicle, energy can be stored in the battery 24 without increasing the engine exhaust gas. As such, the engine exhaust gas per certain travel distance is smaller in EV mode traveling using the motor regenerative electrical energy Pr than that of HV mode traveling. As such, according to the control based on the external and regenerative charge ratio, travel can be performed while considering reduction of engine exhaust gas.

As an alternative to the forced HV setting control shown in FIGS. 2 and 3, forced HV setting control may be performed based on Pt−w*Pd which is obtained in such a manner that a discharge ratio coefficient w is calculated by dividing the externally charged electrical energy Pt by the sum of the externally charged electrical energy Pt, the motor regenerative electrical energy Pr, and the engine-generated electrical energy Pe, that is, w=Pt/(Pt+Pr+Pe), and a value Pt−w*Pd is obtained by subtracting a value, obtained by multiplying the discharged electrical energy Pd by the discharged ratio coefficient w, from the externally chargeable electrical energy Pt. In this case, a residual external charge ratio (Pt−w*Pd)/Pa, which is calculated by dividing the value Pt−w*Pd by the total charged electrical energy Pa, is used for control.

Figure 4:
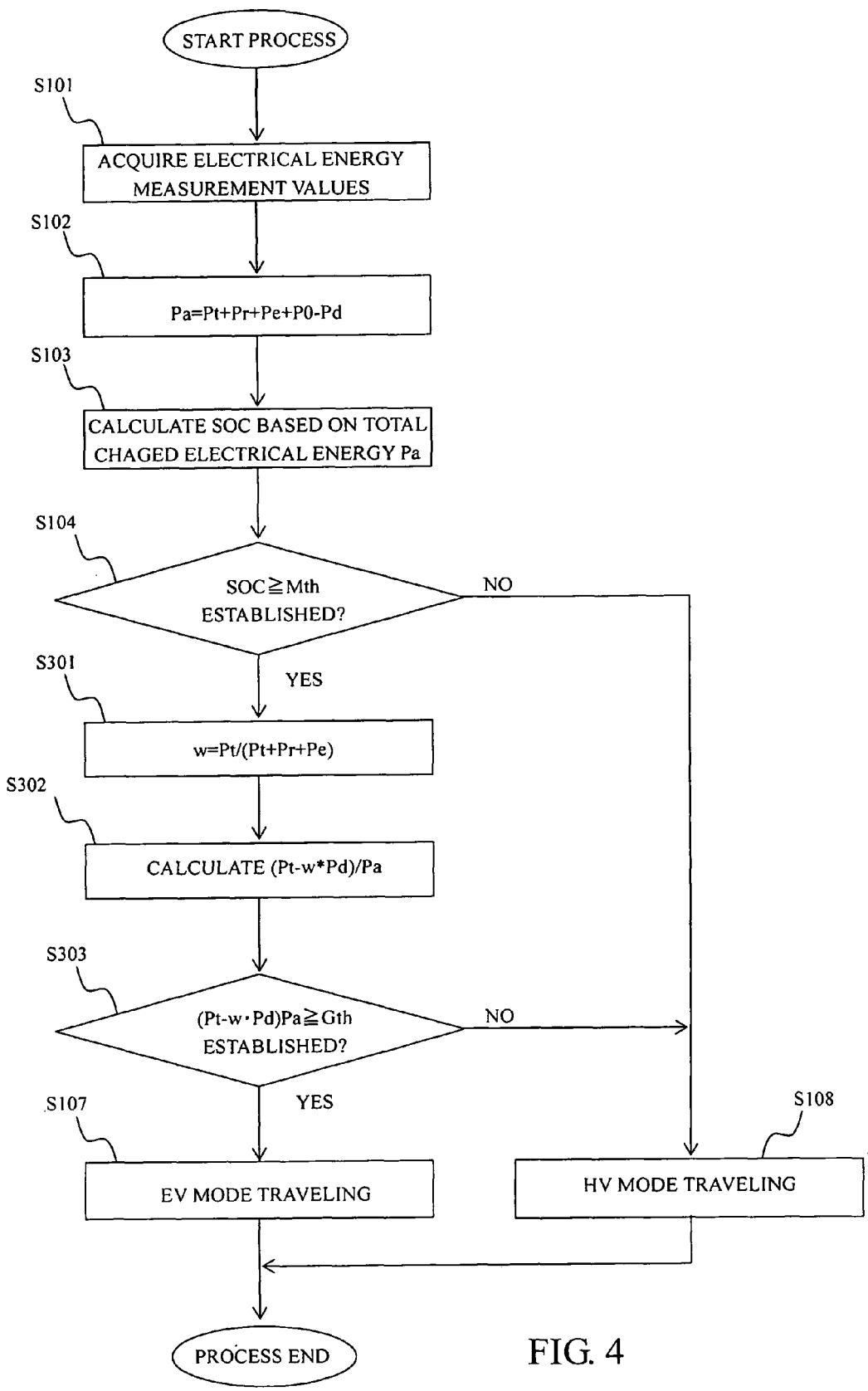
FIG. 4 is a flowchart showing forced HV control based on a residual external charge ratio (Pt−w*Pd)/Pa.

FIG. 4 is a flowchart showing the forced HV setting control of this case. The same steps as those shown in the flowchart of FIG. 2 are denoted by the same reference numerals and the description is not repeated. In the control based on this flowchart, when the control unit 26 determines that the value of the SOC is the HV mode transition threshold Mth or larger (S104), the control unit 26 calculates the discharge ratio coefficient w=Pt/(Pt+Pr+Pe) (S301). Then, the control unit 26 calculates the residual external charge ratio (Pt−w*Pd)/Pa (S302), and performs determination of forced HV setting based on the residual external charge ratio (Pt−w*Pd)/Pa (S303).

The value Pt−w*Pd calculated by subtracting the value, obtained by multiplying the discharged electrical energy Pd by the discharged ratio coefficient w, from the externally charged electrical energy Pt indicates residual externally charged electrical energy obtained by subtracting the discharge contributing amount w*Pd of the externally charged electrical energy Pd from the externally charged electrical energy. The discharge ratio coefficient w is set based on an assumption that the externally charged electrical energy Pt, the motor regenerative electrical energy Pr, and the engine-generated electrical energy Pe are discharged in proportion to the charged amount ratio.

According to the forced HV setting control based on the residual external charge ratio, determination of forced HV setting can be made while considering the electrical energy reduced by discharging. As such, stricter control than the forced HV setting control shown in FIG. 2 can be made. It is also acceptable to use a predetermined constant value for the discharge ratio coefficient w, instead of calculating the discharge ratio coefficient w according to step S301.

As an alternative to the forced HV setting in FIGS. 2 to 4, forced HV setting control may be performed based on Pt+Pr−u*Pd which is obtained in such a manner that a discharge ratio coefficient u is calculated by dividing the sum of the externally charged electrical energy Pt and the regenerative charged electrical energy Pr by the sum of the externally charged electrical energy Pt, the motor regenerative electrical energy Pr, and the engine-generated electrical energy Pe, that is, u=(Pt+Pr)/(Pt+Pr+Pe), and the motor regenerative electrical energy Pr is added to the externally charged electrical energy Pt, and a value obtained by multiplying the discharged electrical energy Pd by the discharge ratio coefficient u is subtracted from the resultant value. In this case, a residual external and regenerative charge ratio (Pt+Pr−u*Pd)/Pa, obtained by dividing the value of Pt+Pr−u*Pd by the total charged electrical energy Pa, is used for the control.

Figure 5:
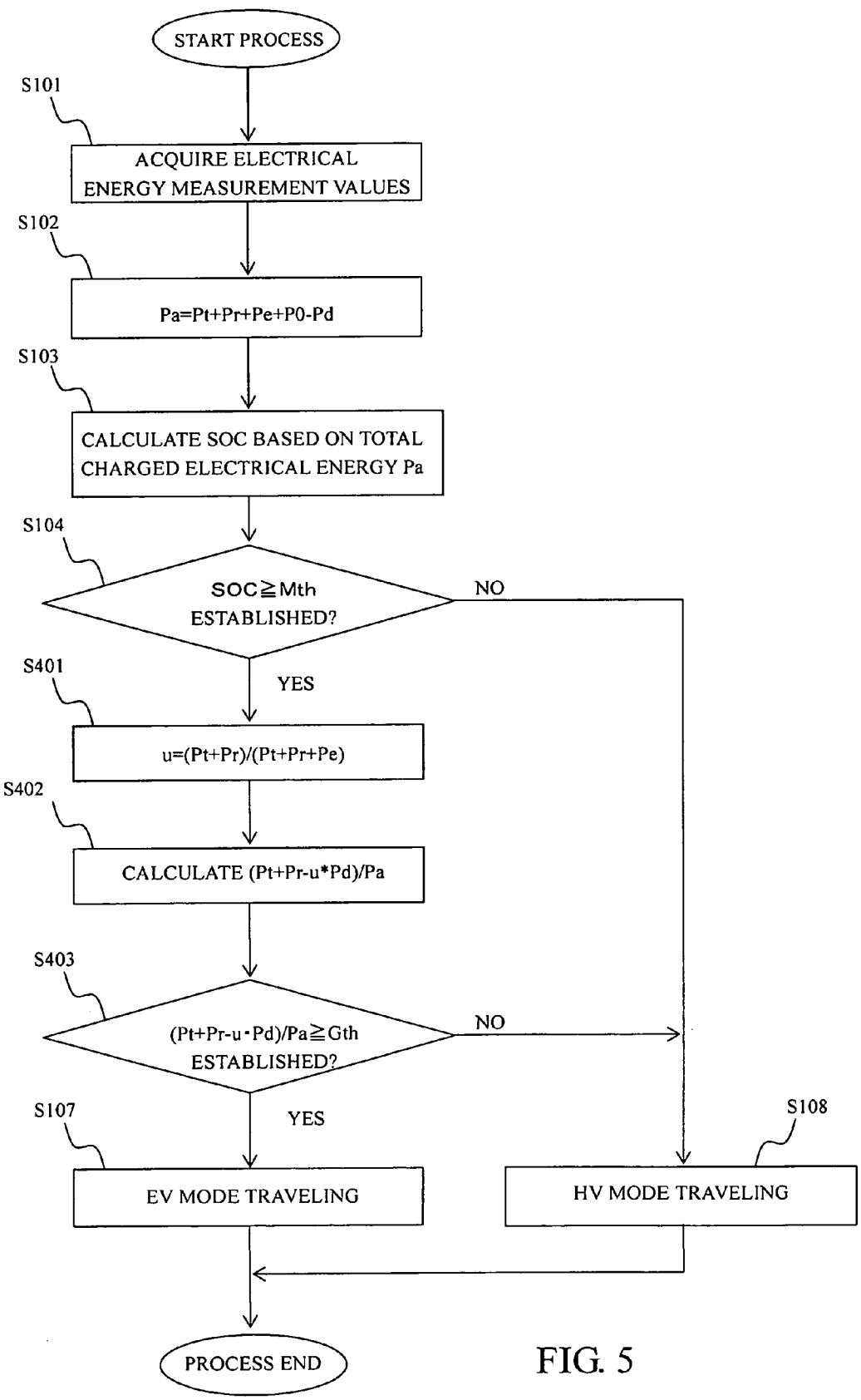
FIG. 5 is a flowchart showing forced HV control based on a residual external and regenerative charge ratio (Pt+Pr−u*Pd)/Pa.

FIG. 5 is a flowchart showing forced HV setting control of this case. The same steps as those shown in the flowchart of FIG. 2 are denoted by the same reference numerals and the description is not repeated. In the processes according to the flowchart of FIG. 5, when the control unit 26 determines that the value of the SOC is the HV mode transition threshold Mth or larger (S104), the control unit 26 calculates the discharge ratio coefficient u=(Pt+Pr)/(Pt+Pr+Pe) (S401). Then, the control unit 26 calculates the residual external and regenerative charged ratio (Pt+Pr−u*Pd)/Pa (S402), and determines forced HV setting based on the residual external and regenerative charge ratio (Pt+Pr−u*Pd)/Pa (S403).

According to the forced HV setting control based on the residual external and regenerative charge ratio, it is possible to determine forced HV setting while considering the electrical energy decreased by discharging, which is the same as the case of forced HV setting control based on the residual external charge ratio. As such, the control can be performed in a stricter manner than the forced HV setting control shown in FIG. 3. Further, compared with the forced HV setting control based on the residual external charge ratio, determination is made such that the motor regenerative electrical energy Pr is used more actively for the EV mode traveling. As a result, it is possible to perform traveling while considering lower engine exhaust gas. It should be noted that it is also acceptable to use a predetermined constant value as the discharge ratio coefficient u, instead of calculating the discharge ratio coefficient u in accordance with step S901.

The forced HV setting control shown in FIGS. 3 to 5 has been described to be performed based on electric energies measured by the externally charged electrical energy measuring unit 36, the motor regenerative electrical energy measuring unit 38, the engine-generated electrical energy measuring unit 40, and the discharged electrical energy measuring unit 42. In place of such control based on the measured amounts of electrical energies, it is also acceptable to perform control based on a measured value of the electrical charge amount. In that case, the respective measuring units should be replaced with those measuring current and time integrated values, and the current integrated values should be converted into charged and discharged electrical charge amounts in the battery 24.

The invention claimed is:

1. An externally chargeable electric/hybrid vehicle, comprising:
 a battery for supplying electrical power to a motor;
 a generator that generates electrical power using a driving force of an engine and charges the battery with generated electrical power; and
 an external charging unit that supplies electrical power from an external power supply device to the battery so as to charge the battery,
 the externally chargeable electric/hybrid vehicle traveling in a travel mode of either an EV mode in which the vehicle travels not by the driving force of the engine but by a driving force of the motor, or an HV mode in which the vehicle travels using at least one of the driving force of the motor and the driving force of the engine, wherein
 the externally chargeable electric/hybrid vehicle further includes:
 a charged amount measuring unit that measures externally charged electrical energy supplied from the external charging unit to the battery; and
 a travel mode determination unit that determines whether the vehicle travels in the EV mode or the HV mode, based on the externally charged electrical energy, and
 the externally chargeable electric/hybrid vehicle travels in a travel mode according to a result determined by the travel mode determination unit.

2. The externally chargeable electric/hybrid vehicle according to claim 1, further comprising,
 a total charged electrical energy measuring unit that measures total charged electrical energy of the battery, wherein
 the travel mode determination unit determines to travel in the HV mode when a ratio of the externally charged electrical energy to the total charged electrical energy is smaller than a predetermined threshold.

3. The externally chargeable electric/hybrid vehicle according to claim 1, further comprising:

a regenerative charging unit that supplies regenerative braking-generated electrical power, generated by the motor through regenerative braking, to the battery so as to charge the battery; and a regenerative amount measuring unit that measures regenerative charged electrical energy supplied from the regenerative charging unit to the battery, wherein the travel mode determination unit calculates a sum of the externally charged electrical energy and the regenerative charged electrical energy as determination reference electrical energy, and determines the travel mode based on the determination reference electrical energy.

4. The externally chargeable electric/hybrid vehicle according to claim 3, further comprising, a total charged electrical energy measuring unit that measures total charged electrical energy of the battery, wherein the travel mode determination unit determines to travel in the HV mode when a ratio of the determination reference electrical energy to the total charged electrical energy is smaller than a predetermined threshold.

5. The externally chargeable electric/hybrid vehicle according to claim 1, further comprising, a discharged electrical energy measuring unit that measures discharged electrical energy output from the battery, wherein the travel mode determination unit calculates determination reference electrical energy by subtracting a value, obtained by multiplying the discharged electrical energy by a predetermined constant, from the externally charged electrical energy, and determines the travel mode based on the determination reference electrical energy.

6. The externally chargeable electric/hybrid vehicle according to claim 5, further comprising, a total charged electrical energy measuring unit that measures total charged electrical energy of the battery, wherein the travel mode determination unit determines to travel in the HV mode when a ratio of the determination reference electrical energy to the total charged electrical energy is smaller than a predetermined threshold.

* * * * *